(12) United States Patent
Flatte et al.

(10) Patent No.: US 8,503,057 B2
(45) Date of Patent: Aug. 6, 2013

(54) ELECTRICALLY-TUNABLE OPTICAL DEVICES

(75) Inventors: Michael Edward Flatte, Iowa City, IA (US); Alexei Kornyshev, London (GB); Michael Urbakh, Ramat Aviv (IL)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 12/989,927

(22) PCT Filed: Apr. 28, 2009

(86) PCT No.: PCT/GB2009/001064
§ 371 (c)(1),
(2), (4) Date: Jan. 28, 2011

(87) PCT Pub. No.: WO2009/133350
PCT Pub. Date: Nov. 5, 2009

(65) Prior Publication Data
US 2011/0116154 A1     May 19, 2011

(30) Foreign Application Priority Data
Apr. 29, 2008  (GB) .................................. 0807793.5

(51) Int. Cl.
*G02F 1/07* (2006.01)
(52) U.S. Cl.
USPC ........................................................ 359/248
(58) Field of Classification Search
USPC ................. 359/296, 265–275, 237, 245, 248, 359/250, 252, 253; 345/105, 107; 204/600, 204/450; 430/32, 34, 38; 977/787, 902, 932, 977/950; 257/436
See application file for complete search history.

(56) References Cited

U.S. PATENT DOCUMENTS

| 7,470,840 B2* | 12/2008 | Emrick et al. ................ 424/490 |
| 7,850,933 B2* | 12/2010 | Yang et al. ......................... 423/1 |
| 2008/0283414 A1 | 11/2008 | Monroe et al. |

FOREIGN PATENT DOCUMENTS
WO    WO 2007/143227 A2    12/2007

OTHER PUBLICATIONS

M.E. Flattéet al., "Understanding Voltage-Induced Localization of Nanoparticles at a Liquid-Liquid Interface." Journal of Physics: Condensed Matter, vol. 20, 072102, pp. 1-9, 2008.
S.A. Empedocles et al., "Quantum-Confined Stark Effect in Single CdSe Nanocrystallite Quantum Dots," Science, vol. 278, pp. 2114-2117, Dec. 19, 1997.
B.O. Dabbousi et al., "(CdSe)ZnS Core-Shell Quantum Dots: Synthesis and Characterization of a Size Series of Highly Luminescent Nanocrystallites," Journal of Physical Chemistry B, vol. 101, No. 46, pp. 9463-9475, 1997.
Bin Su et al., "Adsorption and Photoreactivity of CdSe Nanoparticles at Liquid/Liquid Interfaces," Journal of Electroanalytical Chemistry, vol. 583, pp. 241-247, 2005.

(Continued)

*Primary Examiner* — Tuyen Tra
(74) *Attorney, Agent, or Firm* — Smith, Gambrell & Russell, LLP

(57) ABSTRACT

A device comprising: two mutually immiscible conductive liquids arranged to form an interface therebetween; a plurality of nanoparticles localised at the said interface, the said nanoparticles each having a first region formed of a semiconductor having a first bandgap, the first region being surrounded by a second region having a second bandgap, the second bandgap being larger than the first bandgap; and means for applying an electric field to the said nanoparticles and thus, through the Stark effect, altering the optical absorption or emission characteristics of the nanoparticles.

20 Claims, 5 Drawing Sheets

OTHER PUBLICATIONS

A.P. Alivisatos, "Semiconductor Clusters, Nanocrystals, and Quantum Dots," Science, New Series, vol. 271, No. 5251, pp. 933-937, Feb. 16, 1996.

Guangming Luo, et al., "Ion Distributions Near a Liquid-Liquid Interface," Science, vol. 311, pp. 216-218, Jan. 13, 2006.

S. Schmitt-Rink, et al., "Theory of the Linear and Nonlinear Optical Properties of Semiconductor Microcrystallites," Physcial Review B, vol. 35, No. 15, pp. 8113-8125, May 15, 1987.

Charles W. Monroe et al., "Electrowetting with Electrolytes," Physical Review Letters, vol. 97, pp. 136102-1-136102-4, Sep. 29, 2006.

* cited by examiner

ELECTRICALLY-TUNABLE OPTICAL DEVICES

This invention relates to electrically-tunable optical devices. It is particularly suitable, but by no means limited, for use in optical filters and emitters. Such devices may operate within or outside the visible region of the electromagnetic spectrum.

BACKGROUND TO THE INVENTION

A quantum dot is a nanocrystalline material (also referred to herein as a nanoparticle) having a centre region typically of size 1-100 nm formed of a semiconductor having a first bandgap, the centre region being surrounded by a second region having a second bandgap, wherein the second bandgap is larger than the first. The second region may be, for example, a vacuum, or a second semiconductor. An example of a quantum dot uses cadmium selenide (CdSe) as the centre region and zinc sulphide (ZnS) as the surrounding second region, with ZnS having a larger bandgap than CdSe.

Quantum dots have tunable electronic, optical and magnetic properties depending on the diameter of the nanocrystals from which they are formed[1].

The Stark effect is the shifting and splitting of the spectral lines of atoms and molecules due to the application of an electric field. The amount of splitting or shifting may respectively be referred to as the Stark splitting or Stark shift. Since the frequency of light absorbed (or in some cases emitted) by the atoms or molecules is determined by the frequencies of the spectral lines, the frequency of the absorbed (or emitted) light can be changed, via the Stark effect, by the application of an electric field.

As those skilled in the art will readily appreciate, the term "light" as used herein should be interpreted broadly, to encompass not only visible light but also other wavelengths of electromagnetic radiation outside the visible region. Similarly, the term "optical" as used herein should be interpreted broadly, to encompass not only systems which operate using visible light but also those which operate outside the visible region of the electromagnetic spectrum.

In a semiconductor heterostructure, where a small bandgap material is sandwiched between two layers of a larger bandgap material, the Stark effect can be enhanced by bound excitons. This is known as the quantum-confined Stark effect. The electron and hole which form the exciton are pulled in opposite directions by the applied electric field, but they remain confined in the smaller bandgap material, so the exciton is not merely pulled apart by the field. In practice, the quantum-confined Stark effect has been used for semiconductor-based optical modulators, particularly for optical fiber communications.

However, to date, control of the fundamental absorption edge of a quantum dot with an applied electric field, through the Stark effect [2], has been limited by the electrical breakdown of the material surrounding the dot. This has limited the range of wavelengths over which the fundamental absorption edge of the quantum dot may be tuned.

There is therefore a desire to be able to apply much larger fields to quantum dots, in order to be able to vary the fundamental absorption edge of the quantum dot over a greater range of wavelengths, and thus obtain improved tunable optical properties.

SUMMARY OF THE INVENTION

According to a first aspect of the present invention there is provided a device as defined in claim 1 of the appended claims. Thus there is provided a device comprising: two mutually immiscible conductive liquids arranged to form an interface therebetween; a plurality of nanoparticles localised at the said interface, the said nanoparticles each having a first region formed of a semiconductor having a first bandgap, the first region being surrounded by a second region having a second bandgap, the second bandgap being larger than the first bandgap; and means for applying an electric field to the said nanoparticles and thus, through the Stark effect, altering the optical absorption or emission characteristics of the nanoparticles.

By localising the plurality of nanoparticles at the interface between two immiscible conductive liquids, a larger electric field may be applied to the nanoparticles without incurring electrical breakdown of the surrounding material, compared to conventional techniques known from the prior art. This enables a larger variation in the optical adsorption or emission frequency of the nanoparticles to be achieved, which in turn enables the device to be tunable over a wider range of wavelengths.

We believe no conventional system based on nanoparticle technology can offer such a strong variation of adsorption frequency as that which may be enabled by embodiments of the present invention, because of the large fields that can be applied at an interface between two mutually immiscible conductive liquids. Moreover, due to the self-assembling nature of the interface, the present system is robust, and may be easy and relatively inexpensive to fabricate.

Preferable, optional, features are defined in the dependent claims.

Thus, preferably the nanoparticles are quantum dots, which may have a diameter in the range of 1-100 nm.

Preferably the nanoparticles comprise CdSe as the first region and ZnS as the second region, although alternative materials are also possible.

Preferably the two immiscible conductive liquids are both electrolytic solutions.

Preferably the electrolytic solutions comprise water and an organic liquid mixed with two salts, one salt providing hydrophilic ions which predominantly reside in the aqueous phase, and the other salt providing hydrophobic ions which predominantly reside in the organic phase.

In certain embodiments, the organic liquid may comprise 1,2 dichloroethane or nitrobenzene, although alternative liquids are also possible.

The nanoparticles may be provided with ligands to mitigate against agglomeration of the nanoparticles.

The device may further comprise means to apply an electrical potential across the said interface and thereby alter the curvature of the interface. Thus, if the device is implemented in an electrowetting configuration (as disclosed in U.S. patent application Ser. No. 11/798,901), by applying an electric potential to a working electrode and varying the potential drop across the said interface, the curvature of the interface may be independently altered. This may be used to give the additional properties of a variable focus lens to the device, with a simultaneously tunable transmission spectrum.

According to a second aspect of the present invention there is provided an optical filter comprising a device in accordance with the first aspect of the invention.

In order to increase the level of absorption of incident light, the optical filter may comprising a plurality of the said devices in parallel, or a multi-pass arrangement to cause incident light to pass through the filter a plurality of times.

According to a third aspect of the present invention there is provided electronic apparatus comprising one or more optical filters in accordance with the second aspect of the invention.

According to a fourth aspect of the present invention there is provided an optical emitter comprising a device in accordance with the first aspect of the invention.

According to a fifth aspect of the present invention there is provided electronic apparatus comprising one or more optical emitters in accordance with the fourth aspect of the invention.

According to a sixth aspect of the present invention there is provided a method of forming a device, the method comprising: arranging two mutually immiscible conductive liquids to form an interface therebetween; localising a plurality of nanoparticles at the said interface, the said nanoparticles each having a first region formed of a semiconductor having a first bandgap, the first region being surrounded by a second region having a second bandgap, the second bandgap being larger than the first bandgap; and enabling an electric field to be applied to the said nanoparticles so as to alter, through the Stark effect, the optical absorption or emission characteristics of the nanoparticles.

The method may further comprise applying an electrical potential across the said interface and thereby altering the curvature of the interface. Thus, electric-field-induced manipulation of the shape of the interface, using the electrowetting effect as specified in U.S. patent application Ser. No. 11/798,901, may be employed.

With all the aspects of the invention, preferable, optional, features are defined in the dependent claims.

BRIEF DESCRIPTION OF THE DRAWINGS

Embodiments of the invention will now be described, by way of example only, and with reference to the drawings in which.

In the figures, like elements are indicated by like reference numerals throughout.

DETAILED DESCRIPTION OF PREFERRED EMBODIMENTS

The present embodiments represent the best ways known to the applicants of putting the invention into practice. However, they are not the only ways in which this can be achieved.

As mentioned above, control of the fundamental absorption edge of a quantum dot with an applied electric field, through the Stark effect[2], has to date been limited by the electrical breakdown of the material surrounding the dot. However, we have found that fields greatly in excess of those possible in semiconductor materials can be applied at an Interface of Two Immiscible Electrolytic Solutions (ITIES) in an electrochemical cell[3,4]. Furthermore, nanoparticles can be reversibly localised at this interface through the application of an electric field, whereupon they self-assemble in a two-dimensional layer. Semiconductor nanocrystals localized at an ITIES should have optical properties tunable across much of the visible spectrum, corresponding to at least 560-620 nm wavelength (green to red) for CdSe/ZnS nanoparticles. The transparency of the liquids in such cells indicates that this configuration will be well suited for a new class of self-assembled electrically tunable optical filters.

Figure 1:
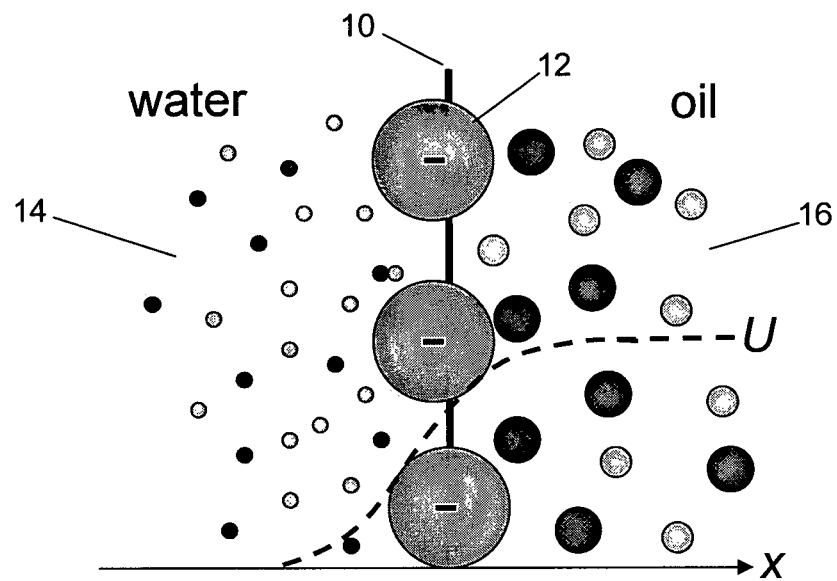
FIG. 1 illustrates the principle of adsorbing negatively charged nanoparticles at an Interface of Two Immiscible Electrolytic Solutions (ITIES)
Figure 2:
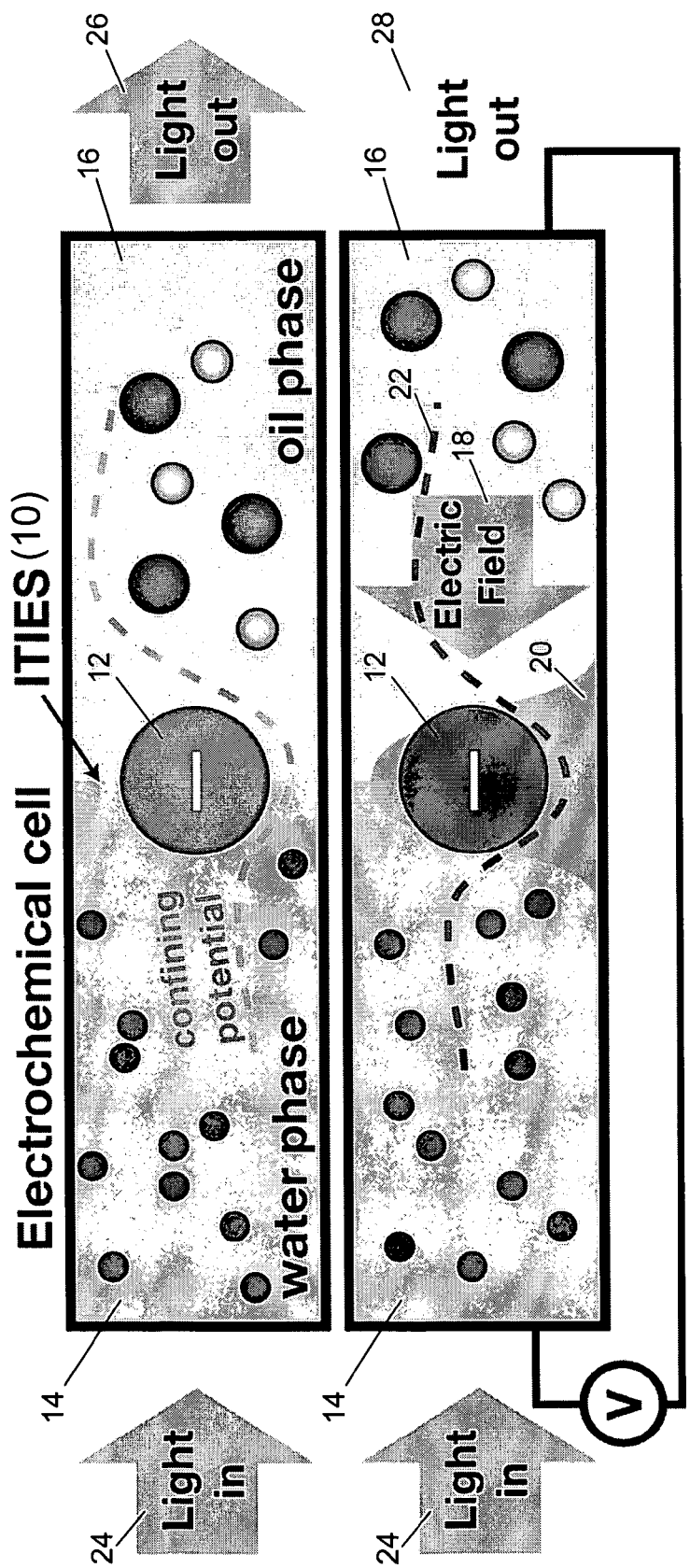
FIG. 2 illustrates an electrochemical cell which may form part of an optical device, the illustration including a schematic view of an ITIES with a negatively charged nanoparticle adsorbed at the interface, with (lower diagram) and without (upper diagram) an applied electric field.

As illustrated in FIGS. 1 and 2, an ITIES occurs between two immiscible liquids. An example of such a system comprises water and an organic fluid, mixed with two salts, one of hydrophilic ions residing in the aqueous phase and one of hydrophobic ions in the organic phase[3-5]. Under the influence of an electric field two "back-to-back" electrical double layers are formed on the two sides of the interface. For typical organic solvents, e.g. 1,2 dichloroethane or nitrobenzene, the interface supports a voltage up to 0.8 V without the ionic current flow across the interface[3-4]. The potential drop is localized at the interface within the two double layers. i.e. within a 1 nm region, depending on salt concentrations, thus corresponding to fields up to 0.8V/nm. This spatial dimension is compatible with semiconductor quantum dots, whose diameters can be as small as 2 nm with 5% size variability. For CdSe/ZnS dots this diameter corresponds to a 490 nm wavelength of emission, in the blue region of the visible spectrum. Thus an ITIES provides a defect-free region for the localization of nanoparticles[6]. To avoid particle agglomeration they may be protected by ligands, attached to the particles by thiol groups, with hydrophilic terminal groups, that can dissociate in aqueous phase. This results in a net charge of the coated particles, which is, however, much smaller than the number of ligands, because of Coulomb repulsion between ionized groups.

Other mutually immiscible conductive liquids may be used to form the electrochemical cell.

FIG. 1 shows a schematic view of an ITIES with negatively charged nanoparticles 12 adsorbed at the interface 10. Positive and negative ions are shown as small spheres (coloured dark and light) in water 14 and in oil 16. The dashed line illustrates the potential distribution across the interface 10 which drives the nanoparticles 12 to the interface 10.

FIG. 2 illustrates a schematic view of an electrochemical cell which may form part of an optical device. The cell contains an ITIES 10 with a negatively charged nanoparticle 12 adsorbed at the interface 10, with (lower diagram) and without (upper diagram) an applied electric field. The peak optical absorption of the nanoparticle 12 is changed by the presence of the electric field. Positive and negative ions are shown as small dark and light spheres in water 14 and in oil 16. The arrow 18 indicates the electric field direction, and the filled region 20 indicates the field strength. The electric field pushes the negatively-charged nanoparticle 12 towards the oil phase 16, and the dashed line 22 sketches the total potential that confines the nanoparticles 12 to the interface 10 [7].

The interface 10 is self-assembling, due to the inherent immiscibility of the liquids 14, 16. The interface may be arranged horizontally if the liquids are arranged one on top of the other (by virtue of the liquids having different densities), or may be vertical by employing a buoyancy effect in a U-shaped tube or chamber.

As illustrated in FIG. 2, incident light 24 may be applied to the cell. In the example illustrated, the incident light 24 is the same in both cases (i.e. with and without the applied electric field). However, as a result of the adsorption characteristics of the nanoparticle 12 changing due to the application of the electric field, in the lower illustration the colour of the output light 28 in the presence of an electric field is different from that of the output light 26 obtained in the absence of an electric field.

The choice of the material for the quantum dot will depend on the optical wavelength of the lowest-energy absorption line when no electric field is applied to the dot. The optical wavelength of the lowest-energy absorption line depends on the bandgap of the centre region of the dot, the bandgap of the second surrounding region, and the radii of the two regions. CdSe/ZnS is just one example of a candidate material for quantum dots.

Figure 3:
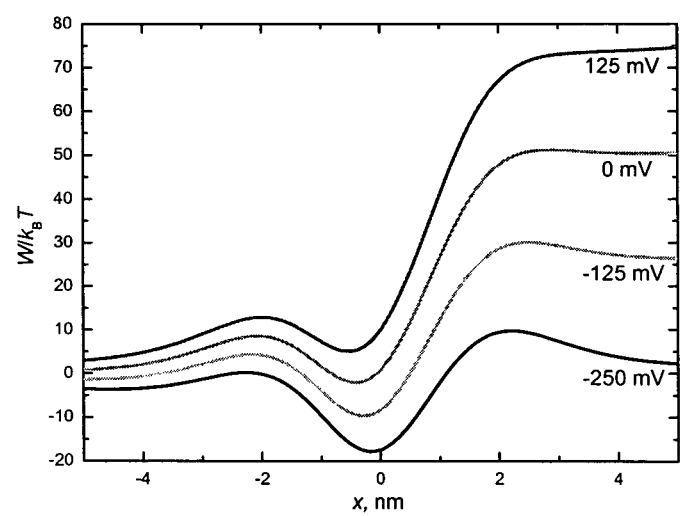
FIG. 3 illustrates the effect of electric field on the potential energy profile for a nanoparticle at an ITIES, the curves corresponding to different potential drops across the interface.

In contrast to larger uncharged particles that spontaneously adsorb at liquid-liquid interfaces in order to reduce interfacial energy, small charged nanoparticles tend to stay in the water phase in the absence of an electric field. The contributions to the confining potential for nanoparticles at the interface between two immiscible electrolytic solutions (ITIES) include competitive wetting, the solvation energy for the charged nanoparticles, the polarizability in an external field, line tension, and the potential contribution from the applied electric field. As illustrated in FIG. 3, calculations demonstrate[7] that the electric fields possible at the ITIES can provide a sufficiently deep potential well to localize the nanoparticles at the interface. Variation of the electric potential allows reversible control of the well depth and therefore the coverage of the interface by nanoparticles. Variation of the concentration of nanoparticles at the interface with an applied electric field will alter the 'opacity of the interface'. This effect may provide tunability further than that permitted by the voltage-tunable colour selectivity coming from the Stark effect, although at a slower speed due to the distance the quantum dots must diffuse.

If the quantum dots must diffuse to the interface through large distances the response time will be slow. However, if the quantum dots are already localized at the interface while the electric field is changed the response time can be much faster. For confined quantum dots the response time of the optical extinction coefficient will be determined by the longer of two times: the response time of the electrical double layers and the response time of the quantum dots in the modified electric field. The response time of the electrical double layers will be governed by the slower response time of the oil phase, for this phase is more viscous and has bigger ions than the aqueous phase. The response time can be crudely estimated as $L_D^2/D$, where $L_D$ is the thickness of the double layer and D is the diffusion constant of the ions. The double-layer thickness of 1 nm and diffusion constant of $10^{-7}$ cm$^2$/s yield a response time of 0.1 µs. The response of the quantum dots due to their minor relocations at the interface can be estimated from the same expression, but the distance moved is 0.1 nm. The diffusion constant for quantum dots is not known precisely, but can be crudely estimated from Smoluchowski theory (based on the size of the quantum dot) to be $10^{-9}$ cm$^2$/s. Thus the response time of the quantum dot is similar to that of the electrical double layers, 0.1 µs. This is sufficiently fast for many practical applications, as described later.

A Stark shift in the energies of both electrons and holes confined to nanoparticles occurs under the influence of an external electric field. The capacitance of the interfacial monolayer of semiconductor nanoparticles is substantially lower than the capacitances of the double layers in the aqueous and organic phases. As a result, more than 90% of the applied electric potential drops across the layer of nanoparticles, providing an unprecedented possibility to tune their optical properties. The approximately linear potential extending through the dot permits carriers to shift nearer to one side of the dot and in the process lower their energy.

In spherical nanoparticles the shift in energy for a carrier is due to the electric-field-induced mixing between the lowest-order S state and the lowest-order P state with quantization axis parallel to the applied electric field. For a uniform sphere of radius R with a hard wall boundary condition at its surface, the electronic wave function of the S- and P-states are the normalized spherical Bessel functions $A_0 j_0(k_s r)$ and $A_1 j_1(k_p r)$; $k_s$ and $k_p$ are the smallest positive numbers such that $j_0(k_s R) = j_1(k_p R) = 0$. The electric-field-induced mixing energy between these two states is the matrix element of the electric field component of the Hamiltonian, eEr, between these two states, and corresponds to one-sixth of the potential energy drop across the nanoparticles, qV/6. The Stark shift will then be $$[(qV/6)^2 + \Delta E_e^2]^{1/2} + [(qV/6)^2 + \Delta E_h^2]^{1/2} - \Delta E_e - \Delta E_h$$

where $\Delta E_e$ is the energy splitting between the two lowest conduction electron states, and $\Delta E_h$ is the energy splitting between the two lowest valence hole states. If $\Delta E_e$ and $\Delta E_h$ are both smaller than qV/6, corresponding to the case of large nanoparticles, then degenerate perturbation theory yields a Stark shift for the absorption peak of qV/3. If not, such as occurs for small nanoparticles, then nondegenerate perturbation theory yields a Stark shift of $$(qV/6)^2/\Delta E_e + (qV/6)^2/\Delta E_h$$

where $\Delta E_e$ is the energy difference between the two lowest-energy unoccupied electronic states, and $\Delta E_h$ is the energy difference between the two highest-energy occupied electronic states.

Figure 4:
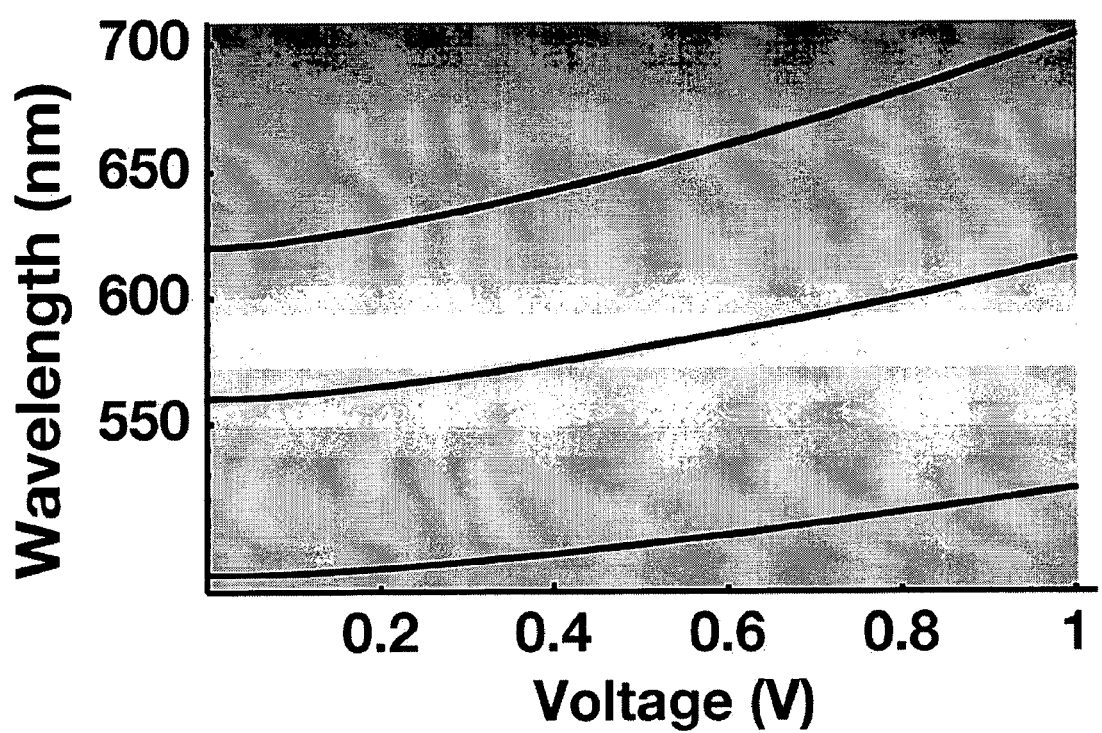
FIG. 4 illustrates a calculated peak wavelength of the low-energy optical absorption as a function of voltage for three sizes of quantum dots.

Plots of the peak energy of the lowest-energy absorption feature as a function of electric field are shown in FIG. 4 for three sizes of CdSe/ZnS dots. The three curves correspond to a zero-field absorption peak of 490 nm, 560 nm, and 620 nm.

Figure 5:
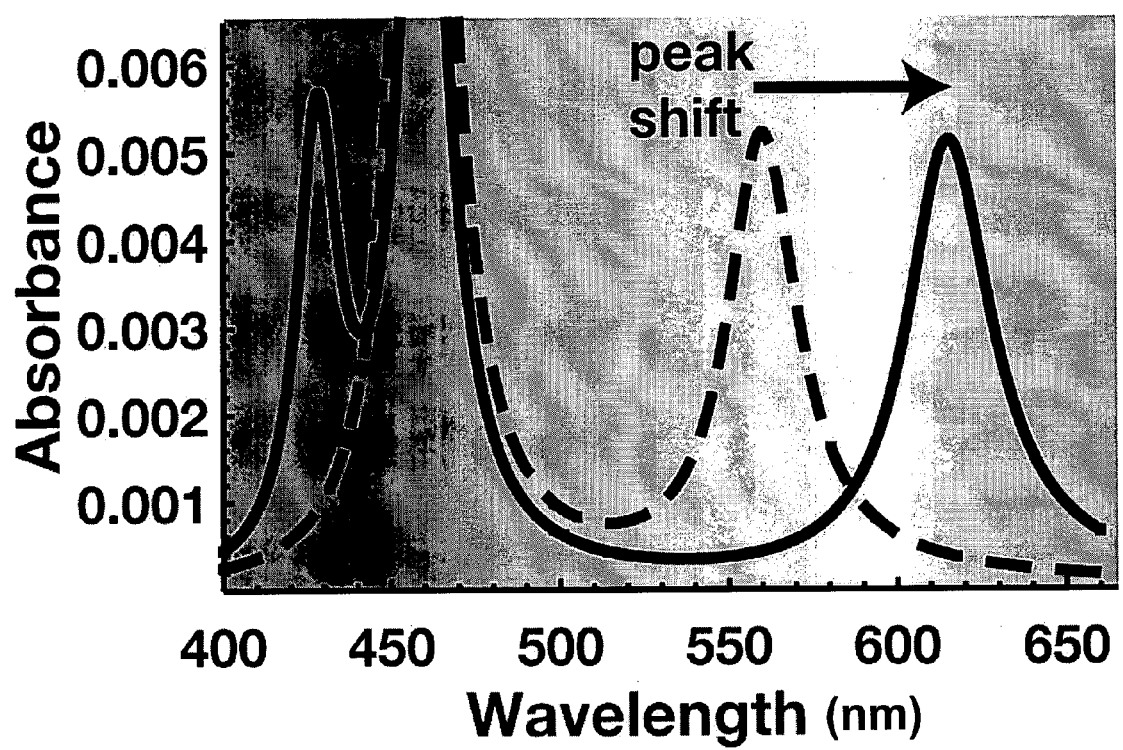
FIG. 5 illustrates a calculated optical absorbance spectrum for a CdSe/ZnS quantum dot with a peak absorption at 560 nm for zero field (dashed line), and shows that, in the ITIES region, an applied voltage of 1 Volt shifts the peak to 620 nm (solid line)

Such quantum dots as CdSe/ZnS, having a zero-field 560 nm peak lowest-energy absorption line, lie in an intermediate regime where the shift is given by $qV/6 + (qV/6)^2/\Delta E_e = 210$ meV. This shift from 560 nm to 620 nm peak absorption for a 1 Volt applied potential, as shown in FIG. 5, corresponds to a change from green to red. This shift is twice as large as the typical room-temperature linewidth of 30 nm for a quantum dot size distribution of 5%, strongly indicating that this colour change survives at room temperature and would have practical importance.

As mentioned, for the most well-studied and robust ITIES the current flow across the interface becomes significant at 0.8V potential drop across the interface; but we also show results for 1V as a more extreme case for ITIES. Note that shifts larger than the room-temperature linewidth can still be achieved for an applied potential as low as 0.5 Volts for the larger dot (620 nm zero-field absorption peak) shown in FIG. 5, so even with the current well-studied ITIES the effect should be remarkable at room temperature.

Nanocrystals of different shape do not have substantially different Stark shifts. The key quantity remains the potential energy drop across the nanoparticles. For example, one-dimensional nanorods with long axes oriented parallel to the applied electric field have calculated Stark shifts that are equal (within 10%) to the Stark shifts for spherical nanocrystals with the same potential energy drop. Thus one may try experiments with different shapes in order to achieve the largest potential drops across the quantum dots, their most stable localization at and maximal coverage of the interface.

We calculate, according to the method of Ref. 8, the optical absorbance of a two-dimensional layer of nanoparticles, assuming a transition from the highest-energy S-state of the valence electrons to the lowest-energy S-state of the conduction electrons. The optical linewidth is assumed to be 100 meV. The electric field shifts the lowest-energy S-state down in energy and the P-state interacting with it up in energy. The other two P-states do not shift in the applied electric field. Thus the second-highest-energy absorption feature for the quantum dots, as shown in FIG. 5, does not shift with applied electric field. The characteristics of the absorption will be the higher-energy feature that is independent of field, and then a lower-energy feature that shifts substantially with applied electric field, yielding the field-tunable optical filtering properties. The room-temperature extinction coefficient of a dense monolayer of quantum dots, corresponding to a surface density of $10^{17}$ m$^{-2}$, would be 0.5% for a single pass (FIG. 5). As the formation of this monolayer at an ITIES can be created over cm² of area, it is straightforward to construct multi-pass geometries to bring the extinction coefficient near to unity.

Figure 6:
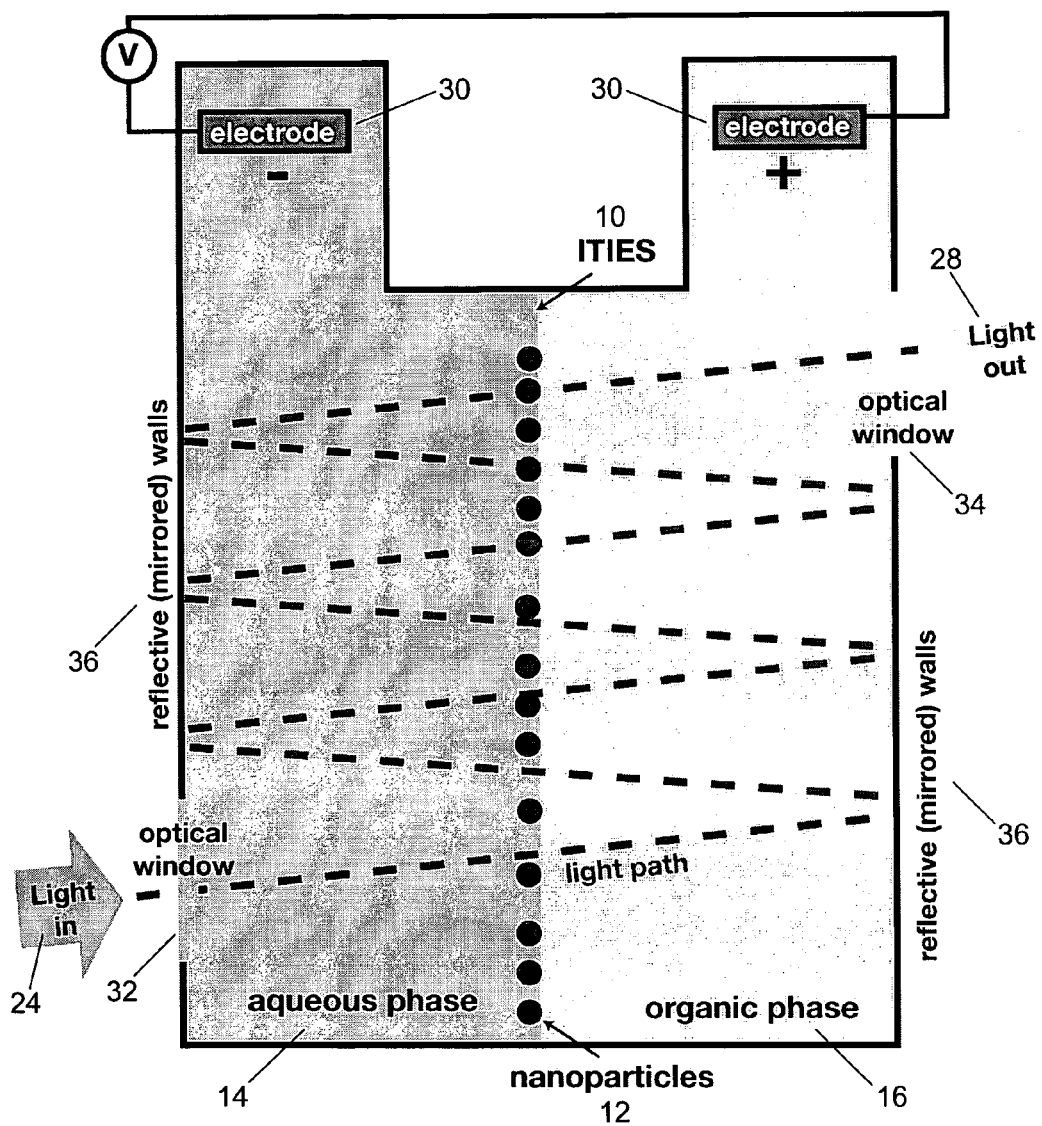
FIG. 6 illustrates an embodiment of an optical filter employing a multi-pass optical geometry.

An example of an optical filter arrangement employing a multi-pass geometry is illustrated schematically in FIG. 6. In FIG. 6, as in FIGS. 1 and 2, the electrochemical cell contains an ITIES 10 between an aqueous phase 14 and an organic phase 16, with a layer of negatively charged nanoparticles 12 adsorbed at the interface 10. An electric field is applied across the interface via electrodes 30 (the electrodes 30 being positioned so as not to interfere with the optical path). Incident light 24 enters the cell through a first optical window 32. Inside the cell, the light is reflected by reflective (mirrored) walls 36, causing the light to pass through the nanoparticle layer a plurality of times, thereby achieving a desired level of absorption. Following the filtering by the nanoparticles 12, the output 28 light is a different colour from the incident light 24, and is transmitted out of the cell via a second optical window 34.

Generation of $10^7$ V/cm stable electric fields in the large-area ITIES provides the first example where Stark shifts of the optical absorption are larger than the room-temperature linewidth of colloidal quantum dots. These fields are also larger than the local fluctuating electric fields in the environment of the quantum dots. Previously observed Stark shifts, caused by smaller electric fields, have not approached the room-temperature linewidth, and have also been susceptible to the local fluctuating fields due to the movement of charges on the ligands[2]. Self-assembly of a monolayer of quantum dots at the ITIES opens the door to new types of electric-field-tunable optical devices.

EXAMPLES OF PRACTICAL APPLICATIONS

Electrically-Tunable Optical Filters

Known electrically-tunable optical filters either have very broad spectral acceptance or very narrow angular acceptance angles. Those with sharp spectral acceptance are commonly based on interference effects, and either involve changing the index of refraction of a material a small amount with an electric field, or changing a length in the device with a mechanical transducer. Those not based on interference effects tend to have very broad spectral features and usually only change the absorbance in a spectral range depending on the electric field. If the filters are not tunable then different filters would need to be used for each colour range in colour imaging, or a different filter would need to be used for each optical communication band, which would then lead to greater expense. Moreover, the efficiency of transmission of an optical filter often suffers when it is made tunable. For example, liquid-crystal tunable optical filters are commonly only 20% efficient at peak transmission. Surface-plasmon-tuned optical filters that have been proposed are only 70% efficient at peak transmission.

In contrast, embodiments of the present invention would change the actual colour of the material used in the filter by shifting the fundamental absorption edge of a quantum dot with an electric field inside an electrochemical cell. As the fundamental absorption colour of the quantum dot is changed, the angle of light passing through the filter can vary widely while still retaining the filtering effects. The size of the electric field applied in the cell is also rather small, of the order of 1 Volt. As all components of the device are very inexpensive, including quantum dots, liquids, container and electrodes, the optical filters made should be much less expensive than many alternative options.

A single monolayer of nanoparticles would not be expected to be particularly effective as an optical filter, since a single monolayer will only absorb about 0.5% of the incident light. It is therefore proposed that a practical filter assembly may comprise a plurality of parallel monolayer filter layers, to increase the overall absorption of incident light. Alternatively, a multi-pass arrangement may be constructed through a single filter layer, for example using mirrors (e.g. as shown in FIG. 6), so that the incident light is passed through the single filter layer a number of times, thereby achieving a desired level of absorption.

Colour imaging systems may benefit from the use of optical filters embodying the present invention. When primary colours are separated before the detector of the imaging system, the image quality is generally better. The filters can also be narrow-band, letting only a small range of wavelengths through, or wide-band, letting a broad range of wavelengths through. Potentially a broader range of colours may be achieved using embodiments of the present invention than may be obtained using LCD filters. The present filters may also be of great use in selecting a narrow range of wavelengths for spectroscopy, or for selecting a particular frequency range for optical communication (e.g. wavelength division multiplexing).

There are many other potential applications for our tunable optical filters. These include the very high-speed, narrow-band filters that are used in optical communication (e.g. from a single wavelength laser); the slow, very narrow-band filters used in gas-spectroscopic devices such as FTIRs (Fourier-transform infrared spectroscopes); and filters arranged to absorb one or more wavelengths of light from a multiple wavelength source (e.g. sunlight)—as may be found, for example, in a display panel or a projector for a computer.

There are important potential applications outside the visible wavelength range as well. For spectroscopic uses in liquid environments, such as medical sensing (blood glucose, etc.) conventional filters are too big for a compact device or are too narrow-band. One existing solution, which is cumbersome and awkward, is to provide a series of LEDs with slightly different emission frequencies to cover the frequency range of interest. It will be appreciated that it would be much more efficient to use a single broad-band source and a tunable filter embodying the present invention to change the peak wavelength that is illuminating the sample. This would involve using these tunable dots in the near-infrared spectral region (2-5 microns) or the long-wavelength infrared spectral region (8-12 microns).

One or more conventional filters may be used in conjunction with the tunable filter(s) in the optical path. For example, a conventional pre-filter can be used before the tunable filter to remove an undesired wavelength or a range of such wavelengths.

Electrically-Tunable Optical Emitters (e.g. LEDs and Lasers)

Recently light emitting devices, including lasers, have been demonstrated based on inexpensive solution-processed colloidal quantum dots. The ability of embodiments of the present invention to tune the emission wavelength of a quantum dot laser over 200 meV (estimated theoretically from reasonable parameters) would correspond to tuning the wavelength of emitted light by over 60 nm in the visible, and 400 nm in the communications regime (1550 nm). This broad tuning range cannot be matched by any other approach, including those that involve complex and expensive fabrication approaches, such as molecular beam epitaxy. The development of inexpensive tunable lasers could be used in chemical sensing of pollutants for environmental monitoring as well as for medical devices (e.g. breath analyzers and blood glucose sensors).

Whilst a broadband source can be filtered to an optical colour using a tunable optical filter as described above, by using a tunable emitter this dispenses with the need for a filter completely.

Other potential applications for tunable emitters embodying the present invention include tunable photoluminescence lines, and visual display panels comprising an array of emissive pixels. Such a display panel may be a good alternative to those made of organic LEDs, since organic LEDs have a limited lifetime whereas quantum dots may have a significantly longer lifetime.

Variable Focus Lens Combined with a Tunable Filter or Emitter

The curvature of the interface between two immiscible conductive liquids can be altered by the application of an electrical potential, as described by Monroe et al.[9] and as disclosed in U.S. patent application Ser. No. 11/798,901. The techniques described in either of those documents may be combined with the principles described herein, thereby giving an arrangement in which nanoparticles are localised at an interface between two immiscible conductive liquids (giving a tunable filter or emitter as described above), and wherein the curvature of the said interface itself may also be altered. Such an arrangement may be used to add the properties of a variable focus lens to the tunable filter or emitter.

SUMMARY

To date, control of the fundamental absorption edge of a quantum dot with an applied electric field has been limited by the breakdown fields of the solid-state material surrounding the dot. However, much larger fields can be applied at the interface of two immiscible conductive liquids (e.g. two immiscible electrolytic solutions (ITIES)) in an electrochemical cell. These electric fields also localize the quantum dots at the interface. Our work shows that semiconductor nanocrystals localized at the ITIES should have optical properties electric-field-tunable across much of the visible spectrum. The transparency of the liquids in such cells indicates that this configuration would be well suited for electrically tunable optical filters with wide-angle acceptance. Electrically tunable emitters may also be produced.

REFERENCES

[1] P. Alivasatos, *Science*, 271, 933 (1996).
[2] S. A. Empedocles and M. G. Bawendi, *Science*, 278, 2114 (1997).
[3] H. H. Girault and D. H. Schiffrin, in: A. J. Bard (Ed.), Electroanalytical Chemistry, vol. 15, Marcel Dekker, New York, 1989, p. 1.
[4] H. H. Girault, in: J.O'M Bockris et al. (Eds.), Modern Aspects of Electrochem., vol. 25, Plenum Press, New York, 1993, 1.
[5] G. M. Luo, S. Malkova, J. Yoon, D. G. Schultz, B. H. Lin, M. Meron, I. Benjamin, P. Vanysek, M. L. Schlossman, *Science*, 311, 216 (2006).
[6] B. Su, D. J. Fermin, J. P. Abid, N. Eugster, H. H. Girault, *J. Electroanal. Chem.* 583, 241 (2005).
[7] M. E. Flatté, A. A. Kornyshev, M. Urbakh, *J. Phys. Condensed Matter* 20, #073102 (2008).
[8] S. Schmitt-Rink, D. A. B. Miller and D. S. Chemla, *Phys. Rev. B* 35, 8113 (1987).
[9] C. W. Monroe, L. I. Daikhin, M. Urbakh and A. A. Kornyshev, *Phys. Rev. Letts.* 97 136102 (1996).

The invention claimed is:

1. A device comprising:
   two mutually immiscible conductive liquids arranged to form an interface therebetween;
   a plurality of nanoparticles localised at the interface, each one of the plurality of nanoparticles having a first region formed of a semiconductor having a first bandgap, the first region surrounded by a second region having a second bandgap larger than the first bandgap; and
   means for applying an electric field to the plurality of nanoparticles and thus, through the Stark effect, altering the optical absorption or emission characteristics of the plurality of nanoparticles.

2. A device as claimed in claim 1, wherein each of the plurality of nanoparticles is a quantum dots.

3. A device as claimed in claim 2, wherein each of the plurality of nanoparticles has a diameter in the range of 1-100 nm.

4. A device as claimed in claim 1, wherein each of the plurality of nanoparticles comprises CdSe as the first region and ZnS as the second region.

5. A device as claimed in claim 1, wherein the two immiscible conductive liquids are both electrolytic solutions.

6. A device as claimed in claim 5, wherein the electrolytic solutions comprise water and an organic liquid mixed with two salts, one salt providing hydrophilic ions which predominantly reside in the aqueous phase, and the other salt providing hydrophobic ions which predominantly reside in the organic phase.

7. A device as claimed in claim 6, wherein the organic liquid comprises 1,2 dichloroethane or nitrobenzene.

8. A device as claimed in claim 1, wherein each of the plurality of nanoparticles is provided with ligands to mitigate against agglomeration of each of the plurality of nanoparticles.

9. A device as claimed in claim 1, further comprising means to apply an electrical potential across the interface and thereby alter the curvature of the interface.

10. An optical filter comprising a device as claimed in claim 1.

11. An optical filter as claimed in claim 10, comprising a plurality of the devices in parallel.

12. An optical filter as claimed in claim 10, further comprising a multi-pass arrangement to cause incident light to pass through the filter a plurality of times.

13. Electronic apparatus comprising one or more optical filters as claimed in claim 10.

14. An optical emitter comprising a device as claimed in claim 1.

15. An electronic device comprising one or more optical emitters as claim in claim 14.

16. A method of forming a device, the method comprising:
arranging two mutually immiscible conductive liquids to form an interface therebetween;
localising a plurality of nanoparticles at the interface, each one of the plurality of nanoparticles having a first region formed of a semiconductor having a first bandgap, the first region surrounded by a second region having a second bandgap larger than the first bandgap; and enabling an electric field to be applied to the nanoparticles so as to alter, through the Stark effect, the optical absorption or emission characteristics of the plurality of nanoparticles.

17. A method as claimed in claim 16, further comprising applying an electrical potential across the said interface and thereby altering the curvature of the interface.

18. The method of claim 16, further comprising providing a reflective device configured to direct an incident electromagnetic wave to pass through the interface at least two times.

19. The method of claim 16, further comprising providing at least a portion of the plurality of nanoparticles with ligands to mitigate against agglomeration of the plurality of nanoparticles.

20. The method of claim 16, wherein at least a portion of the plurality of nanoparticles comprise CdSe as the first region and AnS as the second region.

* * * * *